No. 670,354. Patented Mar. 19, 1901.
G. DÖLLNER.
ACETYLENE PURIFYING COMPOSITION.
(Application filed Oct. 28, 1898.)
(No Model.)
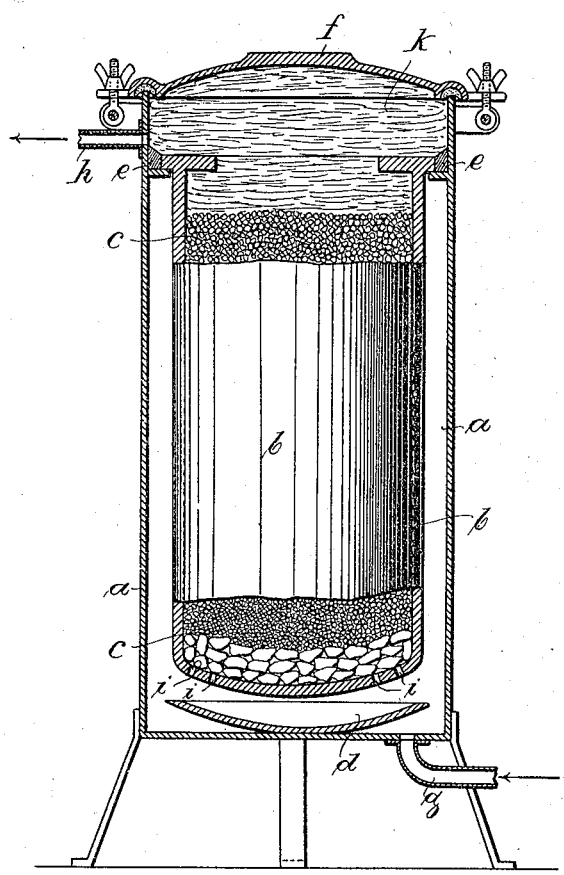
Witnesses:
Carl Ruß
Arthur Scholz
Inventor
Georg Döllner
by Robert Leipsler
Attorney.

UNITED STATES PATENT OFFICE.

GEORG DÖLLNER, OF RIXDORF, GERMANY.

ACETYLENE-PURIFYING COMPOSITION.

SPECIFICATION forming part of Letters Patent No. 670,354, dated March 19, 1901.

Application filed October 28, 1898. Serial No. 694,840. (No specimens.)

*To all whom it may concern:*

Be it known that I, GEORG DÖLLNER, a subject of the King of Prussia, German Emperor, and a resident of Rixdorf, near Berlin, in the Kingdom of Prussia, German Empire, have invented an Improved Acetylene-Purifying Mass, of which the following is an exact specification.

The object of the present invention relates to means for purifying acetylene gas, said means being obtained from carbids and having the purpose to remove the impurities and detrimental products of the acetylene in one single operation. Hitherto it has been tried to remove the impurities by different operations; but such a process is impracticable, for the reason that the purifying is too complicated to be employed in practice. Furthermore, experiments were undertaken to remove impurities of the acetylene by employing oxidation means. Some of these processes have proved the drawback that during the oxidation of the impurities large quantities of the acetylene gas also were oxidized and changed into invaluable and even dangerous and poisonous carbonic oxids. In other processes the presence of oxidation means—as, for instance, chlorid of lime—sometimes causes dangerous explosive compounds.

It has been proposed to purify acetylene by a treatment with acid solutions of metal salts, whereby indeed these solutions remove the largest part of the impurities; but practice has shown that the manner of their employment caused a number of inconveniences, which the present application is proposed to obviate.

The process of employing solutions through which the acetylene is conducted for purifying purposes is based upon deficient principles, for the reason that considerable losses of pressure are resulting. These losses are of importance for acetylene lighting, as owing to the small size of the burner-openings the form of the flame is highly influenced and the flame constantly trembles, a fact to be borne in mind, owing to the small pipes employed with acetylene-lighting plants, in which the least shocks are noticed much more than in the large tubes employed with the ordinary gas-lighting system.

The process of purifying acetylene gas by means of acid-metal solutions has the drawback that in spite of the purifying capacity of these solutions it was hitherto not possible to fully remove the air, reducing the lighting capacity and rendering dangerous the handling of the acetylene. To do away with these drawbacks is the chief purpose of my invention, and this purpose is attained by the purifying means hereinafter fully described, or, more precisely, by the employment of the purifying mass described hereinafter and forming the subject-matter of the claims stated at the end of this specification. This purifying is based upon another principle than the purifying by means of acid-metal solutions, inasmuch as my purifying substance is employed in a compact form. The metal salts when employed in form of powder cannot effect a thorough purifying, owing to the absence of water. The object of my invention is to attain a fine distribution of the purifying metal salts over a porous body. This mass, in combination with mechanically or chemically bound water, is more advantageous than any solution, for its energy is much greater.

In order to produce the mass forming the subject-matter of my invention, I bring a purifying solution into compact form by a porous material sucking up the solution. The porous material in spite of taking up the liquid remains loose at all its parts, thereby allowing the passage of the gas. Another manner by means of which a compact form can be given to acid-metal solutions consists of mixing the purifying substances with salts melted in their crystal water, eventually adding a small quantity of acid and cooling the mixture, whereby the same becomes stiff, thus forming a compact body which can be crushed or brought into powder form of any size and used for purifying acetylene by conducting the gas through the mass. The following mixture, for instance, has been found especially suitable for the said purpose of purifying acetylene. The mixture is produced in the manner hereinafter described as example;

but I especially declare that I do not limit myself to these examples.

First example: 2.2 pounds iron chlorid are solved in twenty-two pounds salt acid of five per cent. The solution is then mixed with porous substances—as, for instance, fossil meal, asbestos, or the like—the substances being taken in such a quantity as to absorb fully the liquid until the remaining mass forms a loose plastic powder. The quantity of the porous substances depends upon their physical capacities. There are, for instance, some fossil meals absorbing very much and some very little liquid.

Second example: 3.52 pounds sulfate of sodium free of water are solved in 3.96 pounds sulfuric acid or hydrochlorid acid of five per cent., the latter being in warm state. As soon as the solution is obtained it gets cooled and a crystallic proportionally-dry pulverizable mass is formed in which the water is bound by the sulfate of sodium in form of crystallization-water.

Third example: Twenty-two pounds of acid sulfate of soda ($NaHSO_4$) are melted and 2.2 pounds sulfate of mercury then added to this melted mass. The same is cooled, and after the solidification it gets ground, in which pulverized form it is apt to be employed. The sulfuric acid of the acid sulfate acts in a similar way as the bound water. Besides, the mass absorbs some water from the air and is then as fit for the reaction as the mass in the first and second examples.

Fourth example: An acid—as, for instance, chromic acid, oxalic acid, or the like—is melted, and a salt suitable for purifying purposes—for instance, chlorid of chromium—is dissolved in the molten acid. The resulting substance is crushed and employed. Eventually a small quantity of water might be added. The purifying mass thus produced is advantageously employed for acetylene-purifying and much more suitable than the salts being in solution. I cannot state distinctly owing to what reason the effect is a better one; but I suppose that the powderous form, or, more precisely, the fine distribution of the acting substance, is the reason for the great efficiency of my purifying mass.

To give an instance, about fifty grains of a metallic salt suitably distributed or mixed in the above-described manner suffice to entirely purify about twenty cubic meters of acetylene of average condition. The effect upon the acetylene itself is so slight that only about 0.3 per cent. of the same becomes transformed into other organic compounds, while when strong oxidation means—as, for instance, chlorid of iron—are employed ten per cent. of acetylene is lost by the oxidation. To completely purify the acetylene, it suffices to conduct the same through thin layers of the heretofore-described substances; but in practice it is advantageous to arrange these layers in an apparatus allowing the insertion of large quantities of purifying mass. Thereby the purifying, in first line, is more effective, and, secondly, an apparatus works during a long time. This is a very important point, inasmuch as the aforedescribed mass, even when highly superposed, does not offer any resistance to the passing gas, and consequently no loss of pressure can be caused. With respect to the liquid purifying this fact is a certain advantage, as a high column of liquid cannot be employed, owing to the enormous losses of pressure which would be the unavoidable reason thereof.

In the following I beg to describe an apparatus serving to take up the above-described purifying mass, and especially being suitable for purifying of acetylene. Such an apparatus, which in first line must be transportable, must have, what concerns its covering, a compact mantle; in second line, because destined for acid-purifying it must contain an inner acid-proof vessel for taking up the purifying mass to be employed, and at last it must contain a certain space for taking up the gas in order to serve simultaneously as a regulator for the sudden variations of pressure within the generator. The following apparatus corresponds to these conditions. The apparatus consists of an outer metal vessel $a$, for instance, of cylindrical form. This outer vessel surrounds an inner vessel $b$, of acid-proof material—for instance, clay, enameled iron, or the like. This inner vessel $b$ has the purpose to take up the purifying mass $c$. In cases where the dropping out of the purifying liquid may be feared, which practically is improbable, a shell or pan $d$, of acid-proof material, can be arranged in the outer vessel. This shell or pan $d$, if desired, may be connected to a projecting border of the outer vessel. The place of contact suitably is rendered tight. The whole is closed by a tight cover $f$. $g$ and $h$ indicate the gas-pipes. The lower part of the inner vessel $b$ is provided with perforations $i$, through which the gas enters the inner purifying vessel. The latter is suitably charged by locating immediately above the entrance-apertures $i$ a layer of crushed stone for the purpose of preventing the dropping down of the purifying mass. Upon this layer of stone the purifying mass is arranged. The upper space $k$ between the inner purifying vessel and the cover is filled out with a layer of asbestos, wool, or the like for the purpose to retain the acid or water vapors eventually withdrawn by the passing gas.

Having thus fully described the nature of my said invention, what I desire to secure by Letters Patent of the United States is—

1. A mass for refining of acetylene, consisting of a dry compound of acid-metal salts and porous substances as fossil meal or the like, as set forth.

2. A mass for refining of acetylene, consisting of an acid-metal salt and a salt containing crystallization-water, said acid-metal salt being solved and carried by the crystallization-water of the latter salt, whereby the whole forms in general a dry mass, as set forth.

3. A mass for refining of acetylene, consisting of a metal salt and a solid acid compound, the metal salt being solved and carried by the formerly-melted and thereafter-solidified acid compound, as set forth.

In witness whereof I have hereunto set my hand in presence of two witnesses.

GEORG DÖLLNER.

Witnesses:
C. H. DAY,
FRITZ SPERLING.